C. F. LAWTON.
PROCESS OF RENDERING MINERAL SUBSTANCES AVAILABLE AS FERTILIZERS BY AID OF FERMENTATION.
APPLICATION FILED SEPT. 14, 1911.
1,029,378.
Patented June 11, 1912.
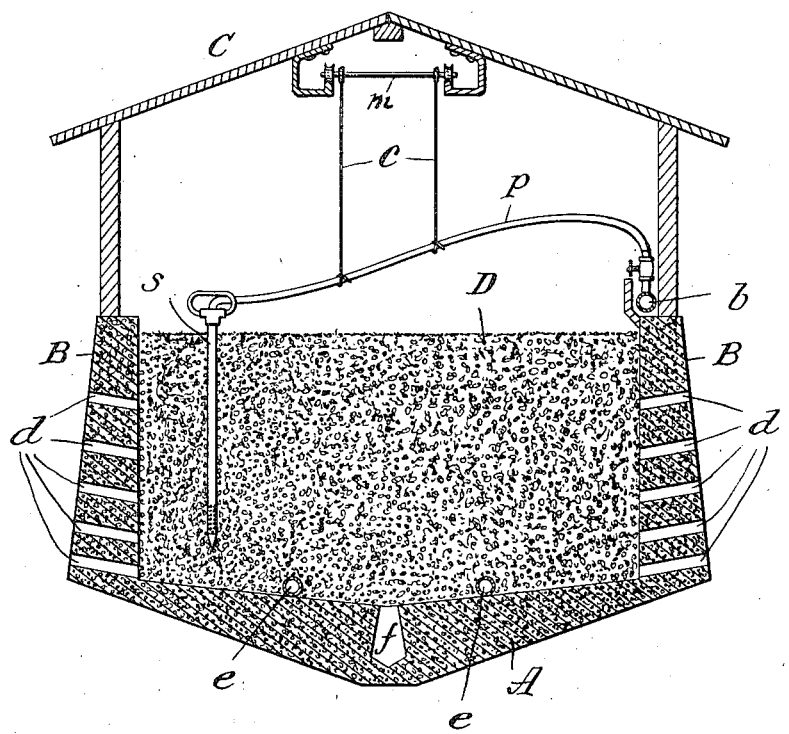

UNITED STATES PATENT OFFICE.

CHARLES F. LAWTON, OF NEW YORK, N. Y., ASSIGNOR TO F. W. HUESTIS, OF NEW YORK, N. Y.

PROCESS OF RENDERING MINERAL SUBSTANCES AVAILABLE AS FERTILIZERS BY AID OF FERMENTATION.

1,029,378.     Specification of Letters Patent.    Patented June 11, 1912.

Application filed September 14, 1911. Serial No. 649,367.

*To all whom it may concern:*

Be it known that I, CHARLES F. LAWTON, a citizen of the United States, and a resident of Brooklyn borough, city and State of New York, have invented a certain new and useful Process of Rendering Mineral Substances Available as Fertilizers by Aid of Fermentation, of which the following is a specification.

Plant-food, as is well known, consists to a considerable extent, of potash, phosphorus, nitrogen, carbon, and various other chemicals most of which are found in nature, bound up in mineral formation, and it is also well known that the process by which these materials are set free in the soil, under the action of rain, is very slow, so much so, that in most agricultural districts, what are known as commercial fertilizers, are required, in order to supply to the growing plants the necessary amount of the above mentioned constituents of plant-food.

The object of my invention is to treat minerals such as feldspar, granite, basalt, trap-rock and other rocks containing fertilizing elements, by an artificial process somewhat akin to that of nature by which the said minerals are sufficiently dissolved to give up or convert into more available form, the food elements, such as potash, phosphorus, and so forth, whereby a more natural and better fertilizer can be produced than the so-called commercial fertilizers in which the disintegration of the potash compounds and other minerals containing fertilzing elements, is brought about by the application of chemicals chiefly of an acid or a caustic character.

The first step of my process, consists in preparing the mineral substances for mixture with the organic substances which I afterward employ. This preparation consists broadly in reducing the minerals to a powder, not necessarily fine, but say about 60 mesh. I have found that first heating the mineral substances to red heat, and then suddenly chilling them by immersion in cold water, renders them more easily crushable and therefore to do so, is of advantage, but is not necessary to carry out my new process.

The powdered mineral substances are to be mixed with organic matter, such as straw, leaves, marsh-grown plants, manure, garbage, sewage or other organic materials in proportions which will vary largely with the character of the organic matter employed, and the refractoriness of the minerals employed. The object of this mixture, as will subsequently appear, is to produce sufficient fermentation therein to render, substantially all of the fertilizing material available as plant food and this requires the presence of a sufficient amount of moisture, and reasonable access of the air. Unless the organic matter, therefore, contains sufficient moisture to saturate the minerals and thus render the entire mixture moist, water should be added. It is important that free moisture should not be present to any special degree as the mixture must not be allowed to become soggy or to lump or coagulate so as to prevent the dissemination of air throughout the mass.

In order to produce the proper amount of fermentation, the temperature should reach somewhere in the neighborhood of 90 degrees Fahrenheit, and this temperature is generated in a natural way, by the decomposition of the organic matter. It would rarely, if ever, be necessary to apply any artificial heat, unless vigorous fermentation is desired at the start in which case the temperature can be raised artificially to between 80 and 90 degrees as soon as the mixture is made without waiting for natural fermentation to reach that point. After this vigorous fermentation is once started, no further heat will be required and the fermentation process will continue of itself until the mass has reached the condition in which practically all the plant food has been converted or rendered available and this will take from three to six weeks.

It will thus be seen that my process consists in bringing a quantity of pulverized mineral substances and a quantity of organic matter, in a condition ready to decay, together and maintaining them in a moist, but not wet mixture, sufficiently open to be aerated by the surrounding air until the fertilizing elements therein contained have been rendered available for plant consumption.

No special apparatus or machinery is required for carrying out this process, but I have shown in the accompanying drawing, what I consider a convenient form of tank house, for this purpose; the same being in cross section.

A is concrete foundation provided with a drain channel $f$, through which any surplus water may be drawn off, and through which also if desired, liquid may be fed to the mixture from below. The side walls B, B, for the height of several feet, are preferably of concrete or brick and provided with numerous openings $d$, $d$, provided for the purpose of admitting air or steam into the mixture. Above this cement or brick structure is mounted a suitable shed C of wood or other desired material, and made high enough to permit of proper manipulation of the pipes which may be used to supply air or heat to the mixture from above.

D is a mixture of powdered mineral matter and organic matter from which the fertilizer is to be obtained by fermentation. In treating this mixture, it is not my intention to agitate the mass, but rather, to raise it to a temperature in the neighborhood of 90 degrees Fahrenheit, at which point vigorous fermentation takes place. This temperature will normally be maintained by the fermenting action itself after once thoroughly started, but in case from any cause, the fermentation slackens in any portion of the mass, it is necessary to stimulate it. To enable myself to do so easily, I provide a pipe $b$, laid lengthwise of the tank and preferably in a non-heat-conducting box, and it is provided at intervals along its length with stop-cocks or valves to which the pipe $p$, $p$, may be attached. This pipe is suspended in any convenient way, by cords $c$, $c$, to a runway $m$, at the top of the tank so that it can be shifted lengthwise of the tank as desired. The tank will preferably be from one hundred to two hundred feet in length and by slipping this pipe along the runway, it may be brought over any portion of the mixture D, which may require attention. The pipe $p$, $p$, is made of rubber or other flexible material, and carries at the outer end, a pointed tube or long nozzle $s$, which may be of iron, the pointed end easily penetrating the mixture from above.

In order to find out whether any portion of the mixture is too hot or too cool, I prefer to use a thermometer attached to a pointed holder so that it may easily be pushed down into the mixture by hand. If, on withdrawing the thermometer, I find that the temperature is too low, or too high, I insert the tube $s$, and then pump in steam or hot or cold air according to whether the temperature should be raised or lowered. It may also be useful to have a number of steam pipes, $e$, $e$, arranged at the bottom of the mixture along the floor of the tank, whereby the mass may be moistened, aerated or heated when desired.

The preliminary heating of the mineral to redness, and sudden cooling, not only render the rock very easily pulverized, to such degree of fineness, as may be desired, but render the silica of the compound silicates of which the rock may be composed more readily separated from the potash, and other bases with which it is compounded, becoming gelatinous or hydrated silica. This separation is brought about by the action of carbonic acid, moisture and air in the fermenting tank. As the mineral when ground, requires considerable moisture for thorough mixing with the organic matter, it should be wet down before mixing unless the organic matter contains an excess of moisture as for instance, in the case of sewage.

The proportions of organic matter, and ground mineral, which are best suited to such fermenting as will decompose all the mineral, vary, naturally within wide limits, according to the quality of the organic matter used. Also to some extent, with the heat, moisture and amount of air, employed in fermenting the mixture. Also, but to a less extent, on the character of the mineral used. In a general way, however, it might be safe to say that if we reckon all the ingredients except the water, 25% of organic matter would be ample.

As the alkalis of the powdered rock, are in much less percentage than the silica, and other constituents, the amount of carbonic acid necessary to be evolved, from the moist fermenting mixture to disintegrate chemically, the mineral contents is relatively small, and the silica, when thus loosened from the complex combinations in which the alkalis form the important link, becomes available as food, for such plants as grasses, in which silica, is demanded for vigorous growth. The alkaline carbonate produced in the fermenting mass, and the azo-humic acids produced by the decay of the organic matter, render the silica soluble even in pure water, while the alkalis as carbonate, are themselves made soluble by the carbonic acid evolved, in the contents of the fermenting tank, in the presence of air and moisture.

As before stated, this fermentation and breaking down of the mineral combinations and organic structure, will go on naturally, under proper conditions of access of air and moisture, without the application of artificial heat and will continue until substantially all the mineral composition is broken down. But it is advisable to start this fermentation rapidly by raising the temperature of the mass through artificial means to the necessary point for vigorous fermentation, and in case of slackening from any cause, to maintain said heat, as otherwise the product of the operation may not be perfect, owing to differences of temperature and hence irregularities in chemical action at different places throughout the mass. After the mixture has been thus reduced to a condition suitable for use as a fertilizer, it can be packed in barrels or other packages, or shipped in bulk to the points of distribution.

I claim:—

1. A process of rendering mineral substances available as fertilizers, by aid of fermentation, which consists first in reducing said mineral substances to powder, second, in mixing the same with a suitable quantity of fermentable organic matter in the presence of water, third, in raising the temperature of the mixture to the fermenting point, and continuing the fermenting by access of air and by the occasional regulating of temperature, moisture and air supply, as may be required, until said mixture has become practically decomposed.

2. A process of rendering mineral substances available as fertilizers, by aid of fermentation, which consists first in reducing said mineral substances to powder, second in mixing the same with a suitable quantity of fermentable organic matter in the presence of water, third in raising the temperature of the mixture to the fermenting point, and allowing the fermentation to go on with access of air, until said mixture is practically decomposed.

3. In a process for making the alkalis phosphates and silica in minerals soluble to serve as fertilizers mixing the finely powdered mineral with fermentable organic matter moisture and air and then inducing a regulated fermentation of the mixture.

4. In a process for rendering the fertilizing constituents of minerals assimilable by plants the method of mixing the powdered mineral with fermentable organic matter and then fermenting the mixture by regulating the heat, moisture and air so as to promote the most rapid decomposition of both the organic matter and the mineral.

C. F. LAWTON.

Witnesses:
LILLIAN E. LINDQUIST,
W. P. PREBLE, Jr.